United States Patent
Sano et al.

(10) Patent No.: US 9,842,232 B2
(45) Date of Patent: Dec. 12, 2017

(54) WIRELESS TAG COMMUNICATION DEVICE AND WIRELESS TAG COMMUNICATION PROGRAM

(71) Applicant: TOSHIBA TEC KABUSHIKI KAISHA, Tokyo (JP)

(72) Inventors: Kouichi Sano, Shizuoka (JP); Jun Yaginuma, Shizuoka (JP); Sunao Tsuchida, Shizuoka (JP); Yasutsugu Sasaki, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 14/160,023

(22) Filed: Jan. 21, 2014

(65) Prior Publication Data
US 2014/0203916 A1    Jul. 24, 2014

(30) Foreign Application Priority Data
Jan. 21, 2013    (JP) .................................. 2013-008663

(51) Int. Cl.
*G06K 7/10*    (2006.01)

(52) U.S. Cl.
CPC ................. *G06K 7/10089* (2013.01)

(58) Field of Classification Search
CPC ........... G06K 7/10099; G06K 7/10366; G06K 7/10465; G06K 7/10029
See application file for complete search history.

(56) References Cited

U.S. PATENT DOCUMENTS

| | | | | |
|---|---|---|---|---|
| 2008/0084277 | A1* | 4/2008 | Korekoda | H04B 5/0056 340/10.1 |
| 2009/0224045 | A1* | 9/2009 | Toda | G06K 7/10099 235/439 |
| 2010/0188211 | A1* | 7/2010 | Brommer | G06K 17/00 340/539.32 |
| 2011/0199193 | A1 | 8/2011 | Sano | |

FOREIGN PATENT DOCUMENTS

| | | |
|---|---|---|
| JP | 2007-074323 A | 3/2007 |
| JP | 2009-098951 A | 5/2009 |
| JP | 2009-187250 A | 8/2009 |
| JP | 2011-123692 A | 6/2011 |
| JP | 2011-237941 A | 11/2011 |

OTHER PUBLICATIONS

English Translation of JP 2011-123692 (A).*
Japanese Office Action with English translation, Patent Application No. JP 2013-008663, dispatch date Apr. 7, 2015.

* cited by examiner

*Primary Examiner* — Nabil Syed
(74) *Attorney, Agent, or Firm* — Patterson & Sheridan LLP

(57) ABSTRACT

A wireless tag communication device for communicating with a wireless tag through a directional antenna includes a wireless tag communication section configured to communicate with the wireless tag, a calculation section configured to estimate a direction range for communicating with the wireless tag based on transmission output power of the wireless tag communication device and an estimated reading distance to the wireless tag, and a display section configured to display the estimated direction range.

21 Claims, 15 Drawing Sheets

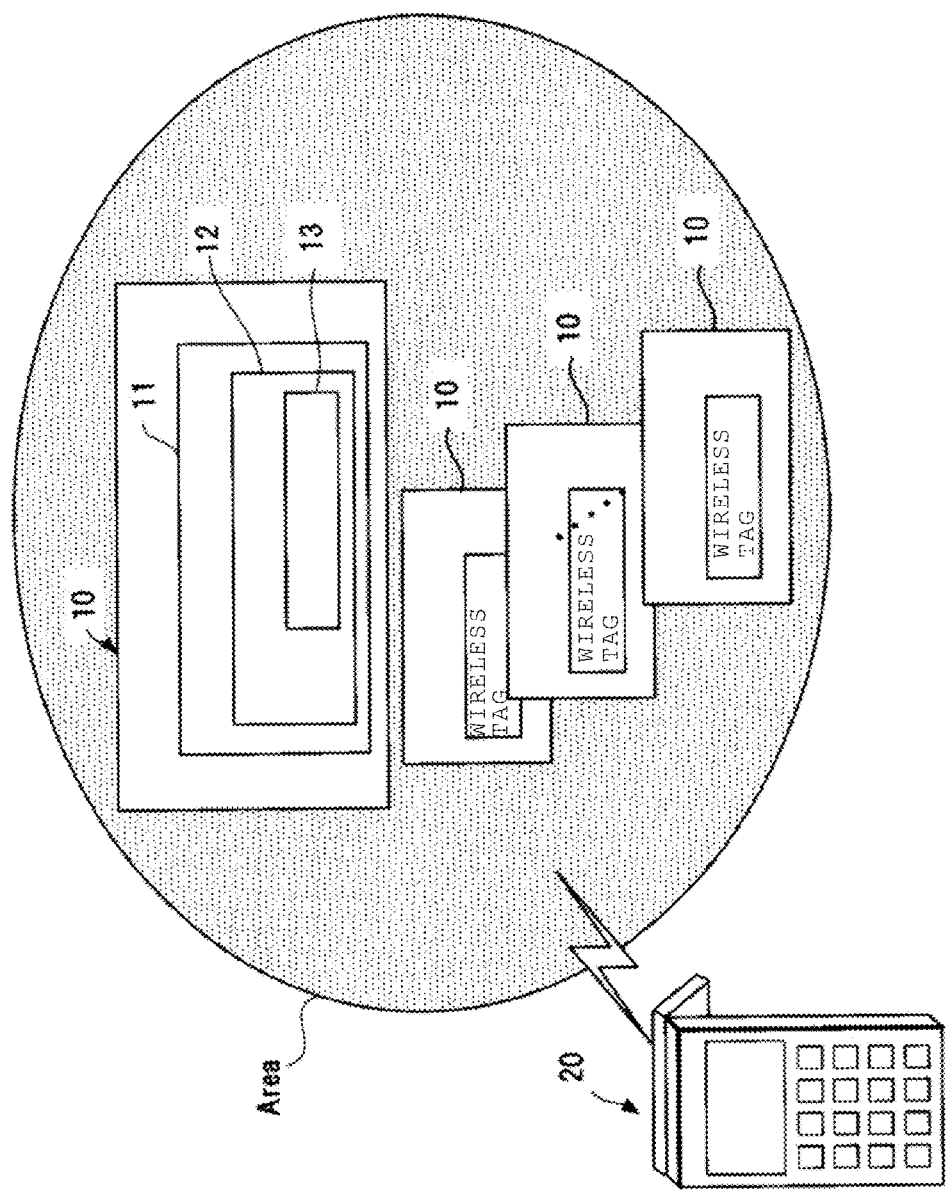

| READING DISTANCE / TRANSMISSION OUTPUT | 0.5m | 1m | 1.5m | 2m |
|---|---|---|---|---|
| 500mW | 180 DEGREES | 140 DEGREES | 90 DEGREES | 30 DEGREES |
| 100mW | 120 DEGREES | 90 DEGREES | 50 DEGREES | 10 DEGREES |
| 50mW | 90 DEGREES | 60 DEGREES | 20 DEGREES | 5 DEGREES |

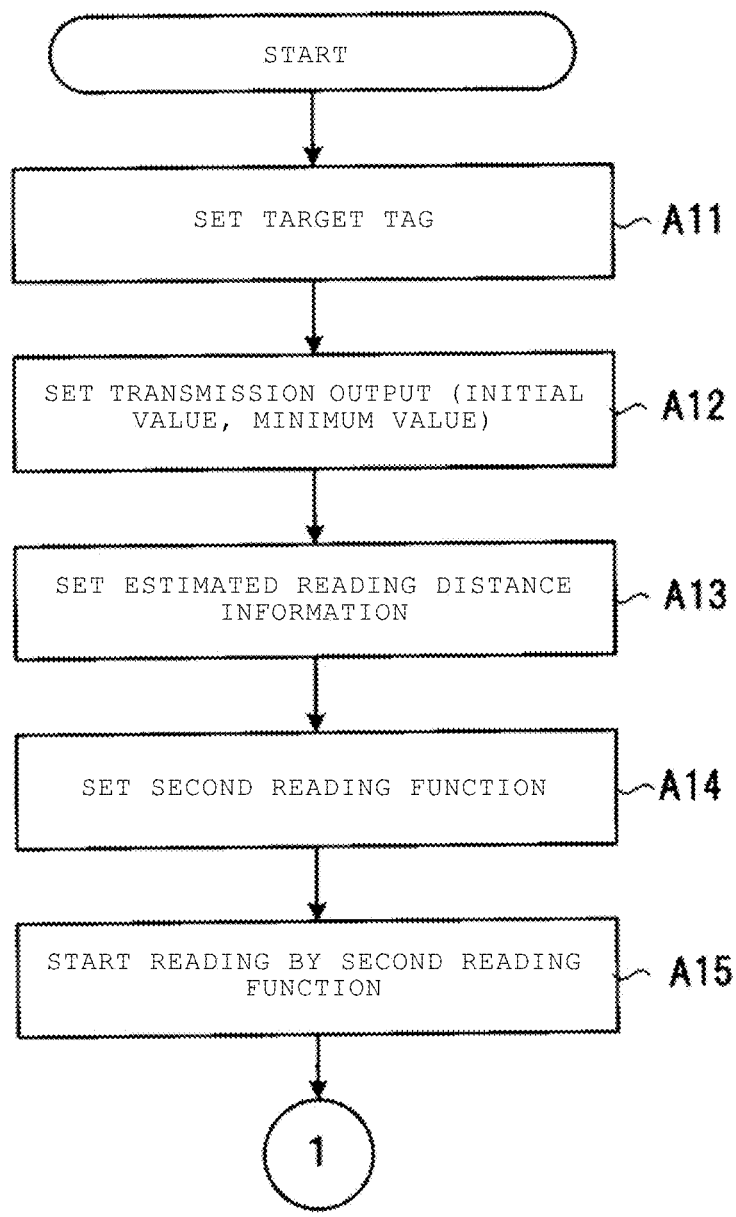

WIRELESS TAG COMMUNICATION DEVICE AND WIRELESS TAG COMMUNICATION PROGRAM

CROSS-REFERENCE TO RELATED APPLICATION

This application is based upon and claims the benefit of priority from Japanese Patent Application No. 2013-008663, filed Jan. 21, 2013, the entire contents of which are incorporated herein by reference.

FIELD

Embodiments described herein relate generally to a wireless tag communication device that communicates with a wireless tag, and a wireless tag communication program.

BACKGROUND

In the related art, a wireless tag is attached to an article such as a commodity or equipment in shops, warehouses, offices and the like, and a wireless tag communication device reads information stored in a memory section of the wireless tag in a noncontact manner to detect the presence of an article. Since information in plural wireless tags can be read in a short period of time, it is desirable to improve the efficiency of detection operation in such a device.

JP-A-2011-237941 discloses a wireless tag communication device that searches for a wireless tag having a specific ID number (identification information) by setting the identification information of the wireless tag to be searched therein and searching for this identification information among wireless tags in which different identification information is stored are respectively attached to a large number of articles.

However, if radio waves of a wireless tag are received through an antenna having a maximum directivity in a specific direction, a readable direction range of the wireless tag with respect to a direction of the antenna varies depending on a relationship between a transmission output of the wireless tag communication device and a position of the wireless tag. For example, when the transmission output power of the wireless tag communication device is large, neighboring wireless tags in a direction in which the directivity of the antenna is small are also read. In this case, a user recognizes that the wireless tag is present in the direction of the maximum directivity and searches the wireless tag while moving forward in the read direction. In the worst case, the wireless tag to be searched may be missed.

DESCRIPTION OF THE DRAWINGS

FIG. 1 is a diagram for explaining an article search using a wireless tag communication device according to a first embodiment.

FIG. 13A is a flowchart showing processing procedures of a control section according to a second embodiment.

DETAILED DESCRIPTION

Figure 2A:
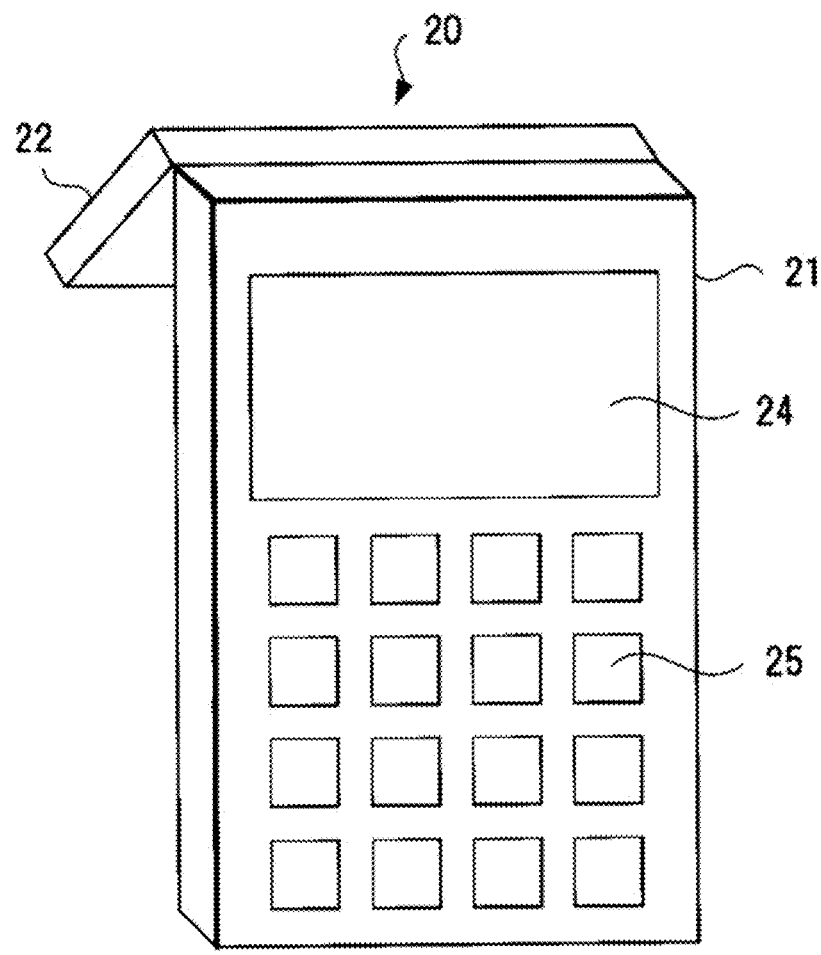
FIG. 2A is an external view of the wireless tag communication device according to an embodiment.

Embodiments provide a wireless tag communication device that can search a target wireless tag in a short period of time without missing the wireless tag to be searched, and a wireless tag communication program.

In general, according to one embodiment, a wireless tag communication device for communicating with a wireless tag through a directional antenna includes a wireless tag communication section configured to communicate with the wireless tag; a calculation section configured to estimate a direction range for communicating with the wireless tag based on transmission output power of the wireless tag communication device and an estimated reading distance to the wireless tag; and a display section configured to display the estimated direction range.

Hereinafter, embodiments will be described in detail with reference to drawings. In each of the drawings, same portions shown in different figures are identified by the same reference numerals.

First Embodiment

FIG. 1 is a diagram for explaining an article search using a wireless tag communication device according to a first embodiment. An article 10 is a commodity or equipment and a plural number of articles (10, 10 . . . ) are present in a target area. The respective articles 10 are provided with wireless tags 11, and identification information (tag ID) 13 which specifies a wireless tag is stored in a memory section 12 of the wireless tag 11. The wireless tag 11 is simply referred to as the "tag 11" in some cases.

FIG. 2A is an external view of a wireless tag communication device 20. The wireless tag communication device 20 includes a main body 21 and an antenna 22, and the main body 21 and the antenna 22 can be integrated to be portable. The main body 21 has a notification section 24 including a display section such as a display, and an input section 25 such as a keyboard. A user makes the wireless tag communication device 20 to read the wireless tag 11 in any arbitrary direction.

Figure 2B:
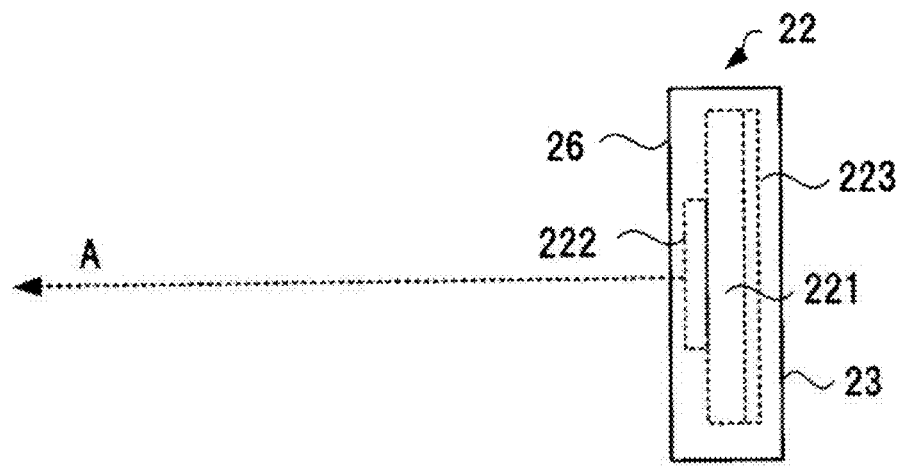
FIG. 2B is a plan view of an antenna according to the embodiment.

FIG. 2B is a plan view of the antenna 22. The antenna 22 is, for example, a planar patch antenna in which a plate-like dielectric 221 is fixed inside an antenna housing 23, a radiator 222 is provided on one surface of the dielectric 221 on the side of an antenna surface 26, and a ground 223 is provided on the rear surface on the opposite side of the radiator. The antenna 22 has directivity having a maximum gain in a substantially perpendicular direction A with respect to the center of the antenna surface 26.

Figure 3:
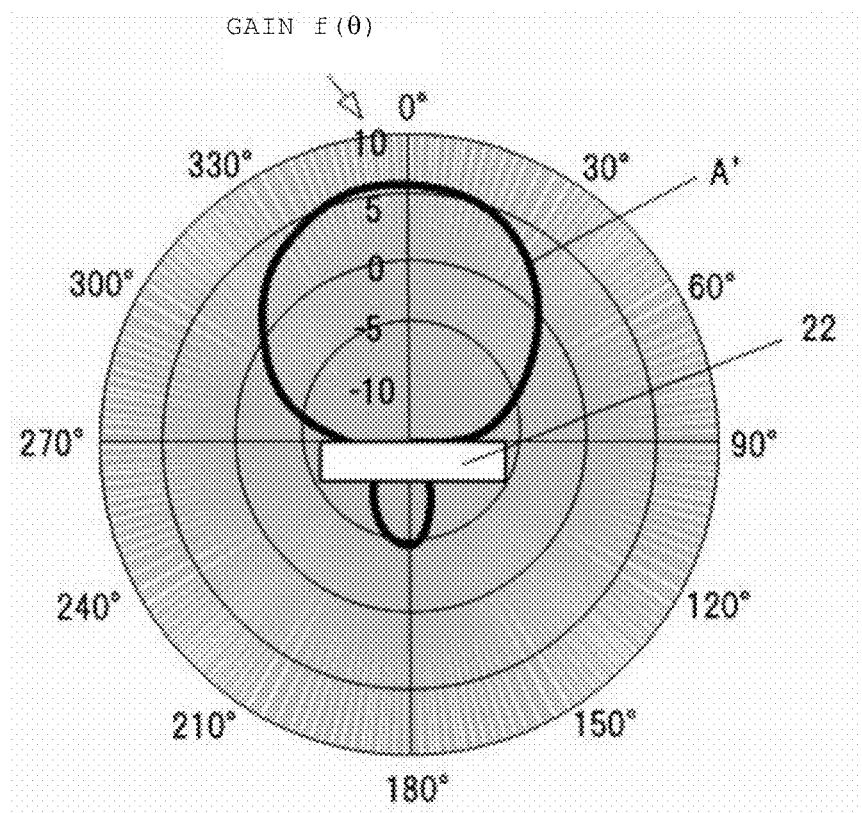
FIG. 3 is a diagram for explaining one example of directivity of the antenna according to the embodiment.

FIG. 3 is a diagram for explaining one example of directivity (A') of the antenna 22. The antenna has directivity in which a maximum gain is obtained in a substantially perpendicular direction (0 degree in FIG. 3) with respect to the center of the antenna 22 and the gain is reduced as the directivity deviates from 0 degree.

Figure 4:
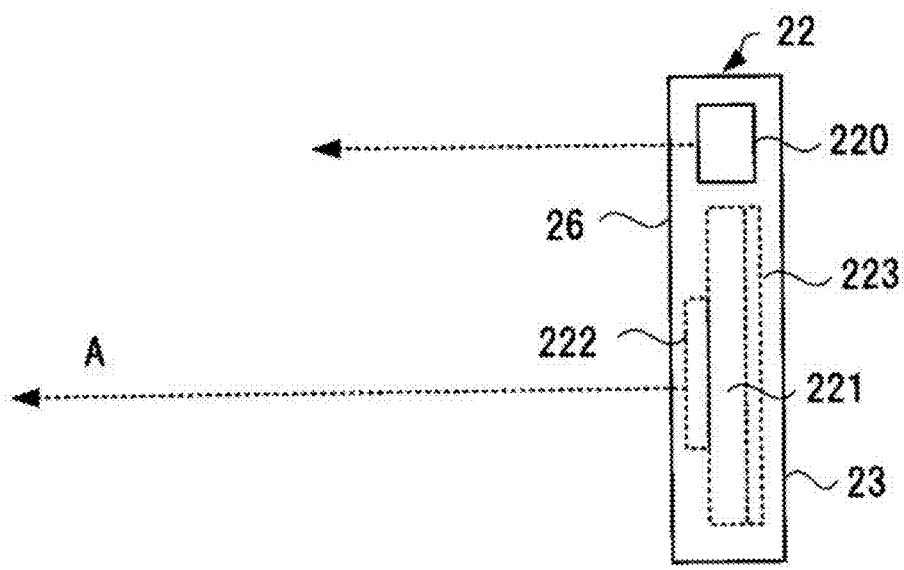
FIG. 4 is a plan view showing another example of the antenna of the wireless tag communication device according to the embodiment.

FIG. 4 is a plan view showing another example of the antenna 22. The antenna has an image capturing section 220 which is arranged by aligning an optical axis with a direction parallel with the direction A in which the directivity of the antenna is maximum, and the image capturing section captures an image of a searching direction when an article search is performed. The image captured by the image capturing section 220 is displayed on the notification section 24 as described later.

Figure 5:
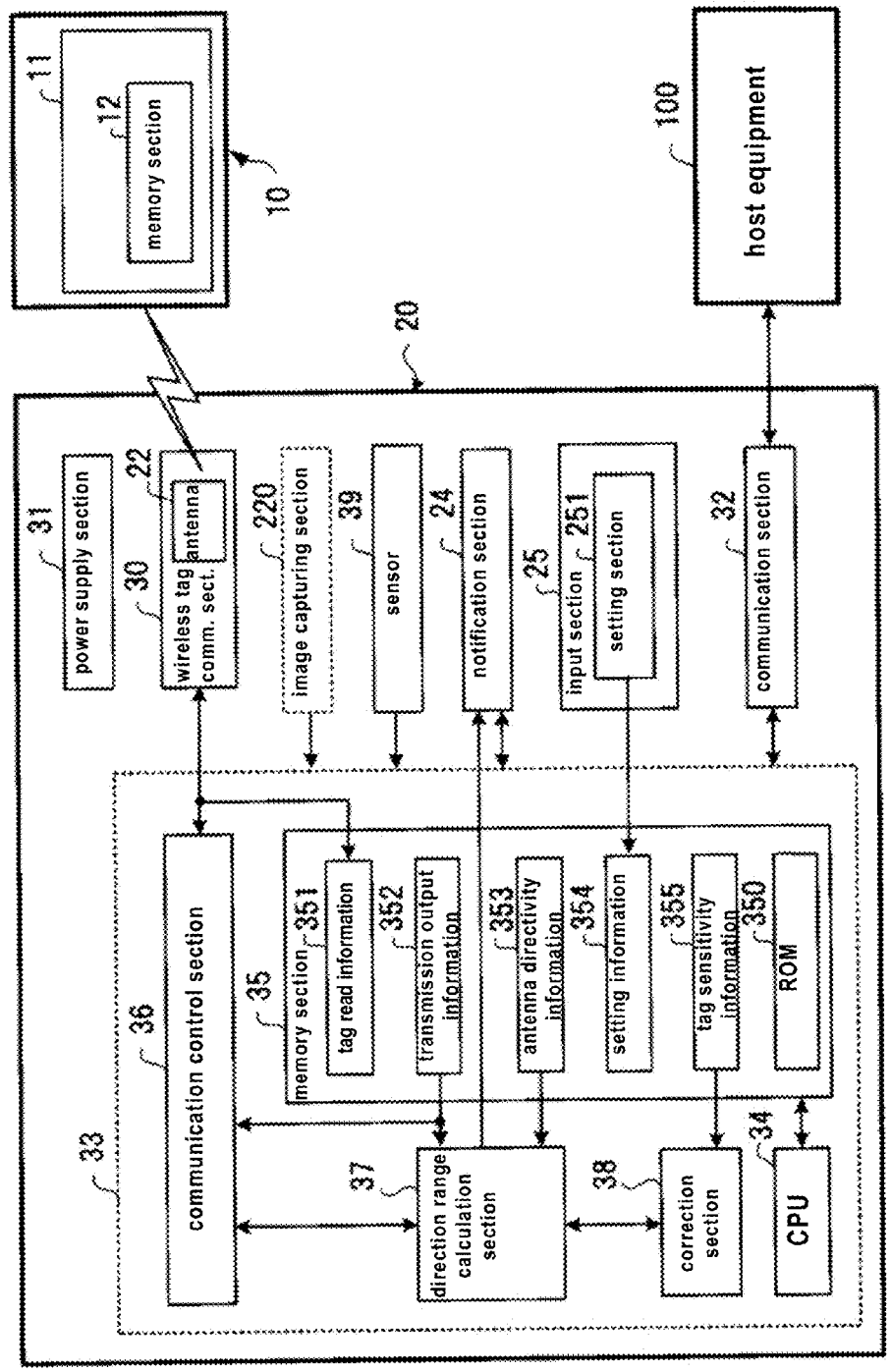
FIG. 5 is a block diagram showing a configuration of a main part of the wireless tag communication device according to the embodiment.

FIG. 5 is a block diagram showing a configuration of the wireless tag communication device 20. The wireless tag communication device 20 (hereinafter, simply referred to as the "communication device 20") includes a wireless tag communication section 30, a power supply section 31, a communication section 32 which communicates with a host equipment 100, and a control section 33, in addition to the notification section 24 and the input section 25. The host equipment 100 is, for example, a server.

The notification section 24 has a display and a buzzer and the input section 25 is configured with a keyboard. The input section 25 may be a touch panel formed on the display of the notification section 24. The wireless tag communication section 30 is provided with the antenna 22 and communicates with the wireless tag 11 by wireless to receive and read the identification information (tag ID) 13 stored in the memory section 12 of the wireless tag 11. The wireless tag communication section 30 will be described in detail later.

The power supply section 31 is formed of a battery and a control circuit which controls charging and discharging of the battery. The communication section 32 communicates with the host equipment 100 which is connected with the communication section 32 through a communication line. The communication line may be wired or wireless. The host equipment 100 stores article information corresponding to the identification information of the wireless tag 11, and the communication device 20 can communicate with the host equipment 100 through the communication section 32.

The control section 33, which is configured like a computer, has a central processing unit (CPU) 34 and controls the entire communication device 20 by controlling the input section 25, the notification section 24, the wireless tag communication section 30, the power supply section 31 and the communication section 32. In addition, the control section 33 has a memory section 35 which is formed of a read only memory (ROM) and a random access memory (RAM). In the ROM 350 of the memory section 35, a program or setting data that the control section 33 uses or the like is stored. In the RAM, variable data is temporarily written by the action of the control section 33.

Further, in the RAM, tag read information 351, transmission output information 352, antenna directivity information 353, setting information 354, tag sensitivity information 355 and the like are stored. The tag read information 351 includes the identification information of the wireless tag 11 received by the wireless tag communication section 30. The transmission output information 352 is information of the current transmission output. The antenna directivity information 353 is gain information of the antenna with respect to an angle. The setting information 354 is information such as the identification information of the wireless tag 11 to be searched and the like. The setting information 354 is set by a setting section 251 of the input section 25. In addition, the antenna directivity information 353 and the setting information 354 may be obtained from the host equipment 100 through the communication section 32 and set. The tag sensitivity information 355 will be described later.

Further, the control section 33 has a communication control section 36 which performs control by setting a transmission output or transmission data to the wireless tag communication section 30 and receives reception data and the like. The communication control section 36 will be described later together with the wireless tag communication section 30.

In addition, the control section 33 has a direction range calculation section 37. The direction range calculation section 37 calculates a direction range by estimating a direction and a range of the tag 11 based on the current transmission output information 352, antenna directivity information 353 and the like. Further, the direction range calculation section generates a visible image in which the direction and the range of the tag can be recognized visually. The visible image is displayed on the notification section 24. Further, the control section 33 has a correction section 38 which corrects the calculated direction of the tag.

In the communication device 20, a sensor 39 is provided. The sensor 39 detects the direction of the communication device 20, the sensor includes a direction sensor, an angle sensor, and a speed and acceleration sensor, and also includes a calculation section which calculates the direction of the communication device 20 based on the detected value of the sensor 39. In addition, as shown in FIG. 4, if the image capturing section 220 is provided, the image capturing section 220 is connected to the control section 33.

Figure 6:
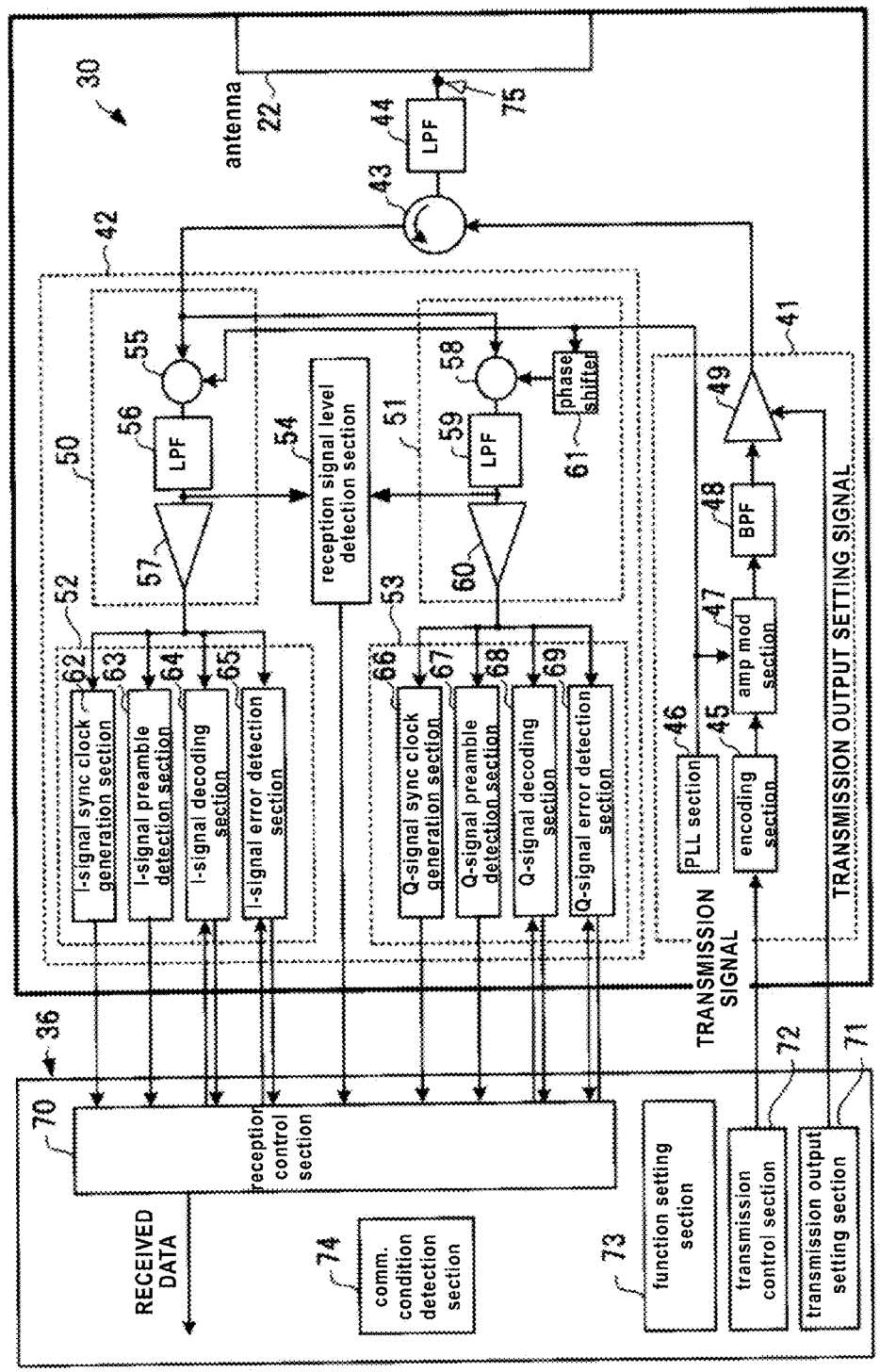
FIG. 6 is a block diagram showing detailed configurations of a wireless tag communication section and a communication control section according to the embodiment.

FIG. 6 is a block diagram showing detailed configurations of the wireless tag communication section 30 and the communication control section 36. The wireless tag communication section 30 has a transmitting section 41 which transmits data to the wireless tag 11, a receiving portion 42 which receives data from the wireless tag 11, a directivity coupler 43 such as a circulator, a low-pass filter 44, and the antenna 22. The transmitting section 41, the receiving portion 42 and the low-pass filter 44 are connected to the directivity coupler 43 and the directivity coupler 43 is connected to the antenna 22 through the low-pass filter 44.

The transmitting section 41 includes an encoding section 45, a phase locked loop (PLL) section 46, an amplitude modulation section 47, a band pass filter 48 and a power amplifier 49. The encoding section 45 encodes a transmission signal output from a transmission control section 72 of the communication control section 36. The PLL section 46 supplies a local carrier signal to the amplitude modulation section 47. The amplitude modulation section 47 amplifies and modulates the local carrier signal from the PLL section 46 by the transmission signal encoded by the encoding section 45.

The band pass filter 48 removes unnecessary components from the transmission signal amplified and modulated by the amplitude modulation section 47. The power amplifier 49 amplifies the transmission signal by an amplification factor according to a transmission output setting signal from a transmission output setting section 71 of the communication control section 36. By amplifying the transmission signal, the transmission output varies and the transmission signal amplified by the power amplifier 49 is supplied to the directivity coupler 43.

The directivity coupler 43 supplies the transmission signal from the transmitting section 41 to the antenna 22 through the low-pass filter 44. The transmission signal supplied to the antenna 22 is emitted from the antenna 22 as radio waves. The wireless tag 11 is activated by receiving the radio waves emitted from the antenna 22. The activated wireless tag 11 performs backscatter modulation with respect to a non-modulation signal so that the information stored in the memory section 12 of the wireless tag 11 is transmitted to the communication device 20 wirelessly. A wireless signal from the wireless tag 11 is received by the antenna 22.

The reception signal received by the antenna 22 is supplied to the directivity coupler 43 through the low-pass filter 44. The directivity coupler 43 supplies the reception signal of the antenna 22, that is, the signal from the wireless tag 11 to the receiving portion 42. The receiving portion 42 includes an I signal generation section 50, a Q signal generation section 51, an I signal processing section 52, a Q signal processing section 53, and a reception signal level detection section 54.

The I signal generation section 50 is formed of a mixer 55, a low-pass filter 56, and a binarization circuit 57. The Q signal generation section 51 is formed of a mixer 58, a low-pass filter 59, a binarization circuit 60, and a 90-degree phase shifter 61.

The I signal processing section 52 is formed of an I signal synchronization clock generation section 62, an I signal preamble detection section 63, an I signal decoding section 64, and an I signal error detection section 65. The Q signal processing section 53 is formed of a Q signal synchronization clock generation section 66, a Q signal preamble detection section 67, a Q signal decoding section 68, and a Q signal error detection section 69.

The receiving portion 42 respectively inputs the reception signal from the directivity coupler 43 to the first mixer 55 and the second mixer 58. In addition, the receiving portion 42 inputs the local carrier signal from the PLL section 46 to the first mixer 55 and the 90-degree phase shifter 61. The 90-degree phase shifter 61 shifts the phase of the local carrier signal by 90 degrees and supplies the signal to the second mixer 58.

The first mixer 55 mixes the reception signal and the local carrier signal to generate an I signal having an in-phase component with respect to the local carrier signal. The I signal is supplied to the binarization circuit 57 through the low-pass filter 56. The low-pass filter 56 removes unnecessary high frequency components from the I signal and extracts an encoded data component. The binarization circuit 57 binarizes the signal passing through the low-pass filter 56.

The second mixer 58 mixes the reception signal and the local carrier signal of which the phase is shifted by 90 degrees to generate a Q signal having a quadrature component with respect to the local carrier signal. The Q signal is supplied to the binarization circuit 60 through the low-pass filter 59. The low-pass filter 59 removes unnecessary high frequency components from the Q signal and extracts an encoded data component. The binarization circuit 60 binarizes the signal passing through the low-pass filter 59.

The I signal binarized by the binarization circuit 57 is respectively supplied to each of the sections 62 to 65 of the I signal processing section 52. In addition, the Q signal binarized by the binarization circuit 60 is respectively supplied to each of the sections 66 to 69 of the Q signal processing section 53. Since the operation of the I signal processing section 52 is the same as the operation of the Q signal processing section 53, the operation of the I signal processing section 52 will be described below and the description of the Q signal processing section 53 will be omitted.

The synchronization clock generation section 62 continuously generates a clock signal synchronized with the binarized signal from the binarization circuit 57 and supplies the generated clock signal to a reception control section 70 of the communication control section 36, the preamble detection section 63, the decoding section 64, and the error detection section 65.

The preamble detection section 63 detects a preamble attached to the head of the I signal based on the clock signal from the synchronization clock generation section 62. If the preamble is detected, the preamble detection section 63 outputs a detection signal to the reception control section 70 of the communication control section 36. When the preamble detection signal is received, the reception control section 70 supplies a command signal for starting decoding to the decoding section 64. The decoding section 64 is synchronized with the clock signal from the synchronization clock generation section 62 and samples the binarized signal from the binarization circuit 57. When the command for starting decoding is received from the reception control section 70, the decoding section decodes the sampled binarized signal. The decoded data is supplied to the reception control section 70.

The reception control section 70 supplies the decoded data to the error detection section 65. The error detection section 65 detects whether or not there is an error from a check code of the decoded data. Then, data showing the detection result is supplied to the reception control section 70. If there is no error in at least one of the I signal and Q signal, the reception control section 70 determines that the data is correctly received. The correctly received data is stored in the memory section 35 as the tag read information 351.

The reception signal level detection section 54 respectively detects the amplitude of the I signal passing through the low-pass filter 56 and the amplitude of the Q signal passing through the low-pass filter 59. The bigger amplitude value is notified to the communication control section 36 as a reception signal level. Alternatively, a vector-synthesized value of the I signal and the Q signal in Equation (1) may be notified as a reception signal level.

$$\sqrt{(I^2+Q^2)} \qquad (1)$$

The communication control section 36 has a transmission output setting section 71, a transmission control section 72, a function setting section 73, and a communication condition detection section 74, in addition to the reception control section 70. The communication condition detection section 74 calculates a reception success rate during a predetermined period of time. Alternatively, the communication condition detection section 74 may detect reception condition using an average value or a maximum value of the reception signal level notified from the reception signal level detection section 54 during a predetermined period of time. The reception success rate is obtained by the Equation (2).

Reception success rate=Number of times in which data is correctly received/(Number of times in which data is correctly received+Number of time in which an error is detected) (2)

A case in which the protocol of ISO18000-6C is used will be described as an example below. The communication device 20 has two functions, a first reading function (normal reading function) and a second reading function (designated repeated reading function) in which the protocol of ISO18000-6C is used. The communication control section 36 includes a function setting section 73, and the function setting section 73 sets one of the first reading function and the second reading function. The transmission control section 72, the transmission output setting section 71, the communication condition detection section 74 of the communication control section 36 perform a corresponding operation according to the function set by the function setting section 73.

The first reading function is a function of performing reading without designating a wireless tag. The first reading function is activated by receiving radio waves emitted from the antenna 22, communicates with the wireless tag 11 in communicable condition, and reads the identification information 13 stored in the memory section 12 of the wireless tag 11.

The second reading function is a function of repeatedly reading the identification information 13 stored in the memory section 12 of the wireless tag 11 by designating a tag which responds to the Select command of ISO18000-6 type C. Further, the second reading function is a function of narrowing a presence range of the designated wireless tag 11 by setting a transmission output setting signal by the transmission output setting section 71 depending on reception condition detected by the communication condition detection section 74 and controlling a transmission output and helps identification of the wireless tag 11 designated by an operator. Further, the second reading function further notifies the notification section 24 of the reception condition detected by the communication condition detection section 74 of the communication control section 36.

Figure 7:
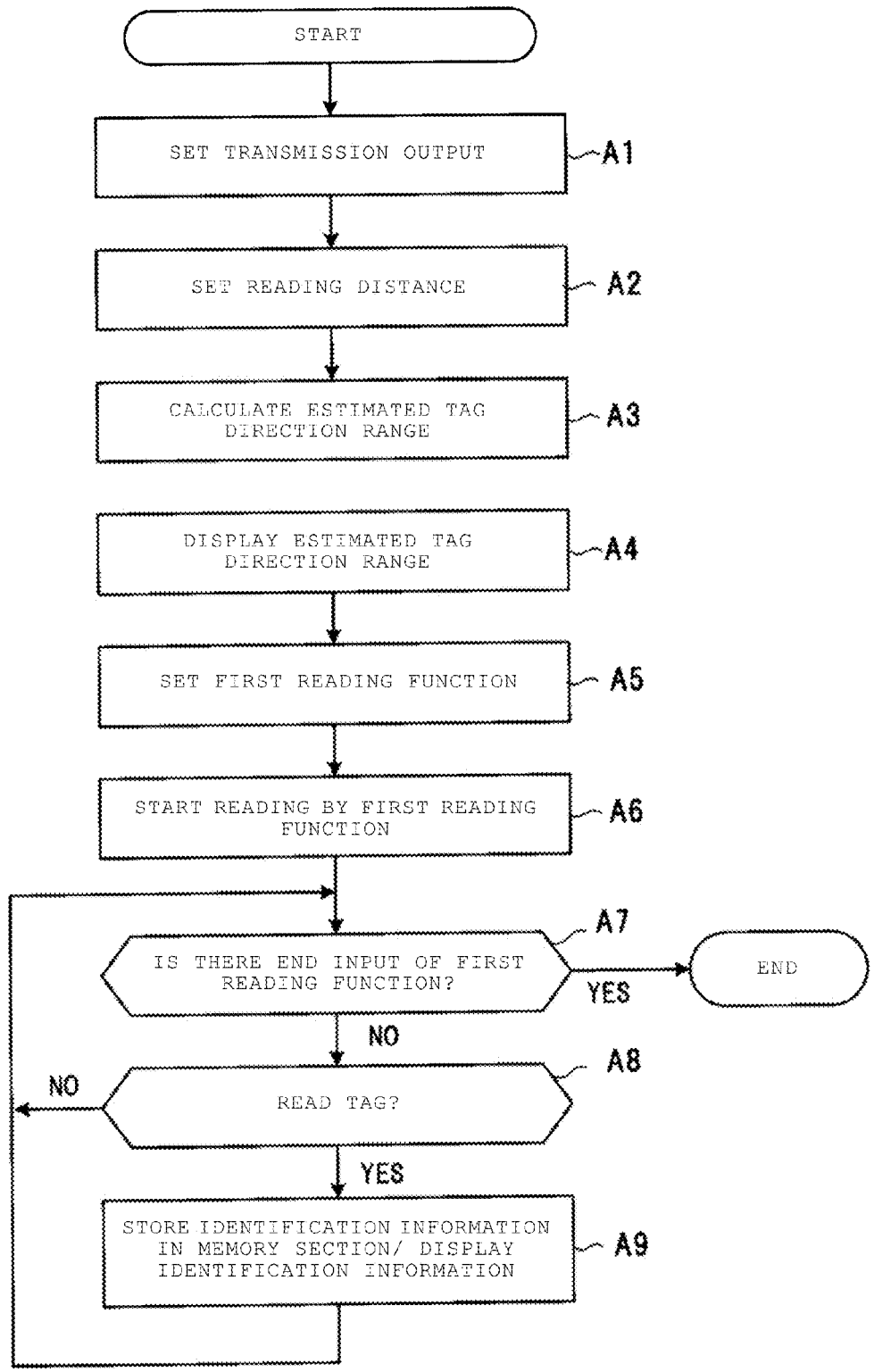
FIG. 7 is a flowchart showing processing procedures of a control section according to the embodiment.

The operation of the communication device 20 according to the embodiment will be described below. FIG. 7 is a flowchart showing processing procedures of the control section 33 when a user performs an operation for reading the wireless tag 11 by the first reading function. The procedures are controlled by a reading operation program stored in the ROM 350.

If an operator carries the communication device 20 and operates a reading operation start key of the input section 25, the reading operation program is started. First, the control section 33 sets a transmission output in a reading operation in Act A1. If there is no input from the input section 25, a transmission output is set by the communication control section 36 using the transmission output information 352 previously stored in the memory section 35.

Next, in Act A2, a distance from the antenna surface 26 to the tag 11 is estimated to set an estimated reading distance. If there is no input from the input section 25, the estimated reading distance information previously stored in the memory section 35 is used. When the information of the transmission output and the estimated reading distance is set, the direction range calculation section 37 calculates a direction range (angle information) by estimating a direction and a range in which the tag 11 is present, for example, by Equation (3) in Act A3.

$$\{P0 \times f(\theta) - d(L)\} \geq Pt \qquad (3)$$

In Equation (3), P0 represents a transmission output at an antenna connection terminal 75 (FIG. 6), and f(θ) represents a gain of the antenna with respect to an angle θ (FIG. 3). When the distance from the antenna surface 26 to the tag 11 is estimated, d(L) represents an attenuation in the estimated reading distance L, and Pt represents power necessary for communication with the target tag 11.

Here, f(θ) is directivity of the antenna as shown in FIG. 3 and is stored in the memory section 35 as the antenna directivity information 353. The attenuation d(L) in the estimated reading distance L from the antenna surface 26 to the tag and the power Pt necessary for communication with the target tag 11 are stored in the memory section 35 in advance, for example, as pre-experimental measurement values. The attenuation d(L) is saved in the memory section 35 as values with respect to several estimated reading distances L.

The power Pt necessary for communication with the tag 11 is saved in the memory section 35 as the tag sensitivity information 355. There are various antennas and IC chips for the tag 11. Pt respectively corresponding to each kind of the tag 11 is stored and the power Pt corresponding to the target tag 11 may be used.

Figures 8, 9:
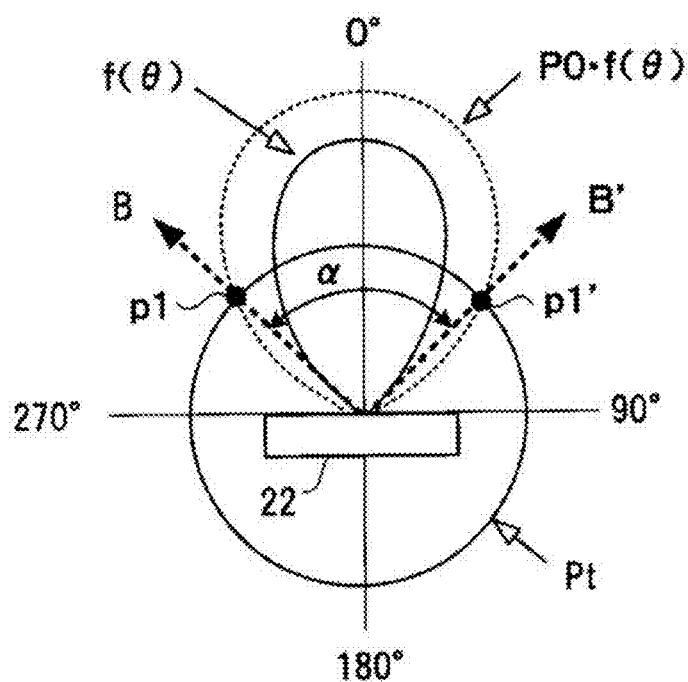
FIG. 8 is a diagram for showing examples of an estimated tag direction range with respect to a transmission output and an estimated reading distance according to the embodiment.
FIG. 9 is a diagram for explaining a calculation example of the estimated tag direction range according to the embodiment.

The direction range calculation section 37 calculates a range (angle) of θ satisfying Equation (3) if the transmission output P0 at the antenna connection terminal 75 and the estimated reading distance L are set. Alternatively, as shown in FIG. 8, ranges of θ satisfying Equation (3) with respect to several transmission outputs P0 and estimated reading distances L may be calculated in advance and stored. Alternatively, the transmission output may be divided simply into three stages of large, medium and small and an angle may be set in each stage.

FIG. 8 is a diagram for explaining examples of an estimated tag direction range (angle) with respect to the transmission output P0 and the estimated reading distance L (referred to as the "reading distance" in FIG. 8). For example, if the transmission output P0 is set to 100 mW and the estimated reading distance L is set to 1 m, the direction range calculation section 37 sets the estimated tag direction range to 90 degrees. As clearly seen from FIG. 8, the larger the transmission output P0 is, the wider the angle is, and the smaller the transmission output P0 is, the narrower the angle is. In addition, the longer the estimated reading distance L is, the narrower the angle is.

FIG. 9 is a diagram illustrating the gain f(θ), the transmission output P0, and the power Pt necessary for communication with the target tag 11. The P0*f(θ) is indicated by a dotted line around the f(θ).

The communication device 20 can search the target tag 11 in an area in which P0*f(θ) and Pt overlap with each other. That is, if intersections of P0*f(θ) and Pt are set to p1 and p1', and lines connecting the center of the antenna 22 (center of the antenna surface 26) and the intersections p1 and p1', are set to B and B' respectively, the presence of the tag 11 in a range of an angle (α) indicated by B-B' can be displayed.

Figure 10:
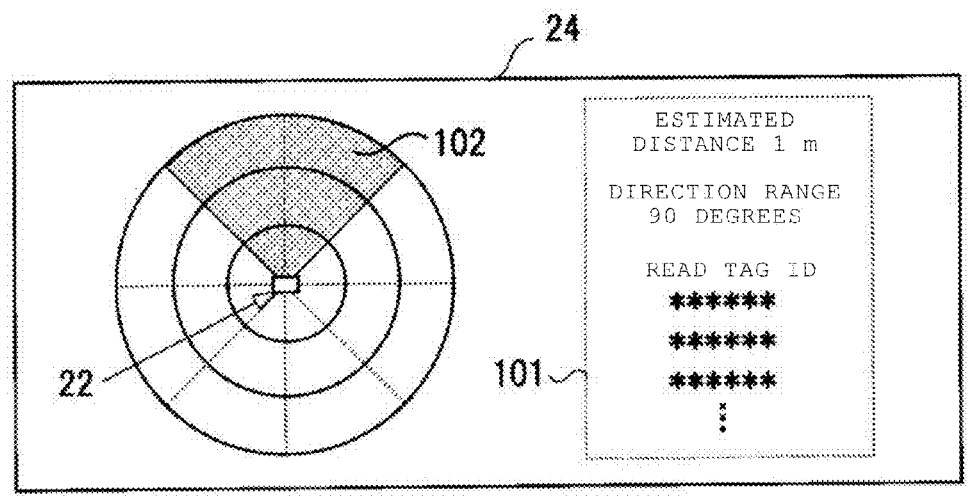
FIG. 10 is a diagram for explaining a display example of the estimated tag direction range in the embodiment.

Returning to FIG. 7, in Act A4, the direction range calculation section 37 generates a visible image in which the calculated estimated tag direction range is visually recognizable to the user to display the image on the notification section (display section) 24. FIG. 10 shows a display example when the visible image of the estimated tag direction range is displayed on the notification section 24. As shown in FIG. 10, the visible image is displayed as characters 101 such as letters, numbers and codes, or is displayed in the form of a radar, in which the center is set to the current position of the antenna 22 (communication device 20) and a fan-like graphic image 102 showing the estimated tag direction range is displayed in the front direction of the antenna 22, so as to be easily recognized visually. The angle indicated by the characters 101 or the angle of the fan-like graphic image 102 corresponds to the angle α indicated by B-B' shown in FIG. 9.

The graphic image 102 is not limited to a fan shape, and may have an inverted triangular shape or two arrows B and B' shown in FIG. 9. The graphic image may be any image as long as a direction and a range of the tag can be indicated.

Figure 11:
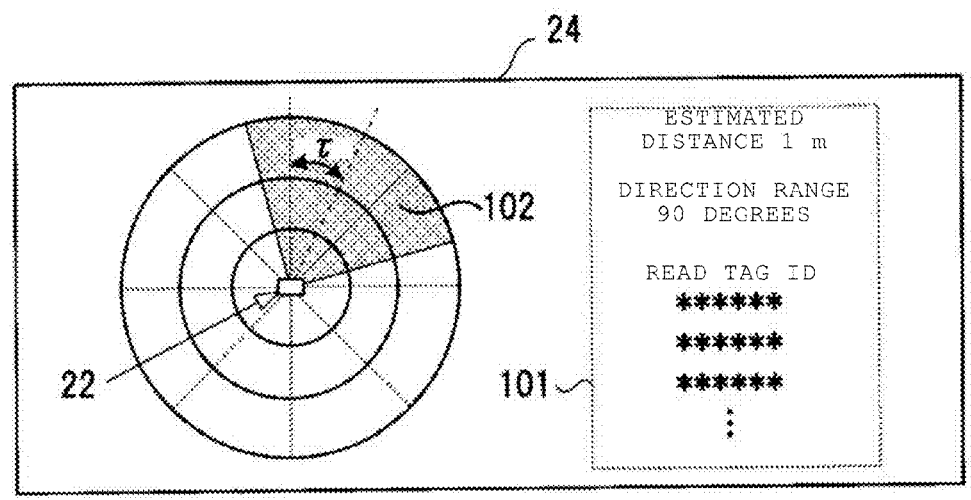
FIG. 11 is a diagram for explaining another display example of the estimated tag direction range according to the embodiment.

In addition, as shown in FIG. 5, since the communication device 20 is provided with the sensor 39 which detects the direction of the communication device 20, the direction of the communication device 20 also can be calculated. For example, after the content shown in FIG. 10 is displayed on the notification section 24, if the user rotates the direction of the communication device 20 in a counterclockwise direction by an angle τ, the sensor 39 detects that the communication device 20 is rotated in the counterclockwise direction by the angle τ, and the direction range calculation section 37 changes the display of the fan-like graphic image 102 on the notification section 24 to a display of the graphic image rotated in the counterclockwise direction by the angle τ using the center as a supporting point as shown in FIG. 11.

Accordingly, even when the communication device 20 is rotated after the wireless tag 11 is read, the user can recognize that the read wireless tag 11 is present within a direction range that is calculated with respect to the current direction of the communication device 20. Therefore, it is possible to efficiently search the target tag in a short period of time without missing the wireless tag.

Next, the control section 33 sets the first reading function by the function setting section 73 (FIG. 6) of the communication control section 36 in Act A5. In Act A5, a transmission output setting signal corresponding to a predetermined transmission output when the first reading function is used is output from the transmission output setting section 71. Further, the transmission signal when the first reading function is used is output from the transmission control section 72, and the transmission control section 72 sets transmission timing and the like. At this time, the setting is made such that the identification information of the wireless tag 11 is read based on the setting information 354.

Next, in Act A6, reading by the first reading function is started. When the transmission output setting signal is output from the transmission output setting section 71, a non-modulation carrier signal is emitted from the antenna 22 as radio waves and the transmission signal is output from the transmission control section 72 to perform transmission to the wireless tag 11.

In Act A7, for example, the control section 33 detects whether an end key in the input section 25 is input. If the input of the end key is not detected, the reading operation by the first reading function continues and if the input of the end key is detected, the reading operation ends.

Figure 12:
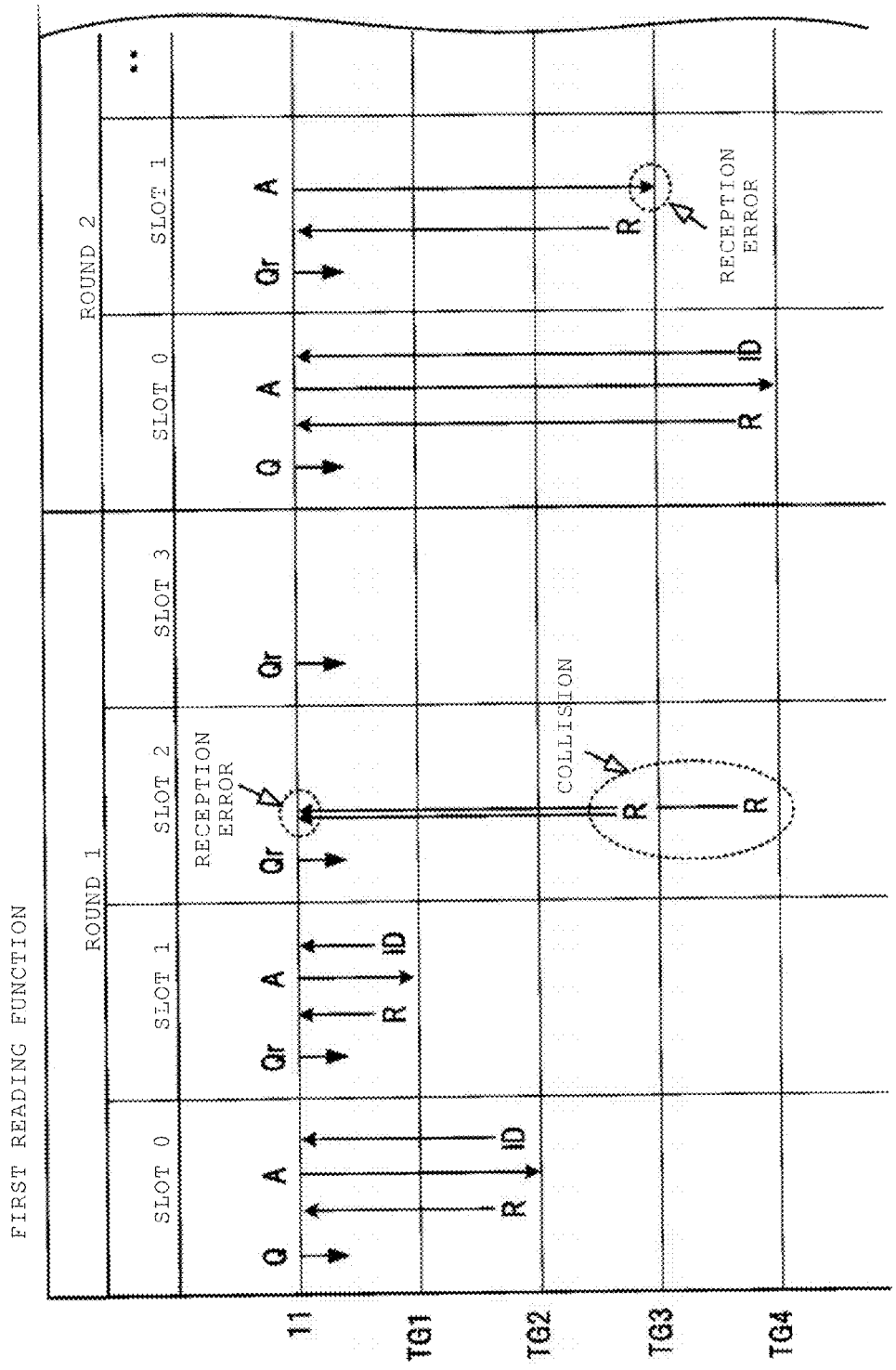
FIG. 12 is a timing chart of a wireless communication protocol of a first reading function according to the embodiment.

FIG. 12 is a timing chart showing an example of a wireless communication protocol between the communication device 20 and four wireless tags TG1 to TG4. As described above, the example according to the protocol of ISO18000-6 type C is described according to which the number of slots per round is "4".

In FIG. 12, all symbols [Q], [R], [A], [ID], and [Qr] indicate communication data. In the head of each communication data, a preamble code indicating the head of data is included and in each communication data, an error detection code such as a cyclic redundancy check (CRC) code is included so as to detect an error on a reception side.

First, the communication device 20 transmits a non-modulation carrier signal from the antenna 22 as radio waves. Each of the wireless tags TG1 to TG4 is activated by receiving the radio waves. Next, the communication device 20 transmits a Query command [Q] for commanding the start of reading in a first round. In the Query command [Q], a parameter (Q value=2) to set the number of slots per round to "4" is included.

When the Query command [Q] is received, each of the wireless tags TG1 to TG4 generates random numbers. Then, each of the wireless tags TG1 to TG4 determines which slot out of the four slots to use in responding in one round using the random numbers. In the same manner, each of the wireless tags generates response data [R] using the random numbers. Since the response data [R] is generated using the random numbers, the response data has different values for each of the wireless tags.

In the example of FIG. 12, the wireless tag TG2 transmits the response data [R] in a first slot 0. If the response data [R] from the wireless tag TG2 is received, the communication device 20 transmits an Acknowledge (Ack) command [A] which commands that the response data [R] is normally received. In the Ack command [A], the response command [R] received from the wireless tag TG2 is included.

The wireless tag TG2 which transmitted the response data [R] waits for the Ack command [A]. Then, if the Ack command [A] is received, the wireless tag confirms whether or not the response data [R] that the wireless tag itself transmitted is included. If the response data [R] is included, the wireless tag TG2 recognizes that the Ack command [A] is transmitted thereto, and transmits ID information [ID] stored in the own memory. The communication device 20 detects the presence of an error if the communication device receives the ID information [ID]. If there is no error, the received ID information [ID] is stored in the memory section 35 as the tag read information 351.

Next, the communication device 20 transmits a Query-rep command [Qr] to command a slot change. However, if the wireless tag TG2 which already transmitted the response data [R] receives the Query-rep command [Qr], the wireless tag does not respond. In the example of FIG. 12, the wireless tag TG1 transmits response data [R] in a second slot 1. After that, operation in the second slot 1 is the same as the operation of the first slot 0, and thus, the description will be omitted. When the communication in the second slot 1 ends, the communication device 20 transmits a Query-rep command [Qr] to command a slot change. However, if the wireless tags TG1 and TG2 which already transmitted the response data [R] receive the Query-rep command [Qr], the wireless tags do not respond.

In the example of FIG. 12, the wireless tags TG3 and TG4 respectively transmit different response data [R] in a third slot 2. The transmission start time of response data [R] is defined to be within a predetermined period of time after a Query command [Q] or a Query-rep command [Qr] is received. Therefore, if two or more wireless tags respectively transmit response data [R] in the same slot, some of the response data [R] inevitably collides during transmission. Therefore, the communication device 20 cannot receive the response data [R] of the wireless tag TG3 and the response data [R] of the wireless tag TG4 and detects a reception timeout of the response data [R].

Next, the communication device 20 transmits a Query-rep command [Qr] to command a slot change and a fourth slot 3 is started. However, in the example of FIG. 12, since the wireless tags TG1 to TG4 already transmitted the response data [R] in Round 1, the wireless tags do not transmit response data [R] in the fourth slot 3 and the communication device 20 detects a reception timeout of the response data [R].

The communication device 20 detects the end of the four slots in Round 1 and transmits a Query command [Q] to command the start of a first slot 0 in new Round 2. In the example of FIG. 12, the wireless tags TG1 and TG2 which transmitted the ID information [ID] do not respond in Rounds after Round 2. In the first slot 0 in Round 2, the wireless tag TG4 transmits a response data [R]. After that, operation of the first slot 0 in Round 2 is the same as the operation of the first slot 0 in Round 1, and thus, the description will be omitted.

When the communication in the first slot 0 in Round 2 ends, the communication device 20 transmits a Query-rep command [Qr] to command slot change. In a second slot 1 of Round 2, the wireless tag TG3 transmits a response data [R]. If the communication device 20 receives the response data [R] from the wireless tag TG3, the communication device transmits an Ack command [A] to command that the response data [R] is normally received. In FIG. 12, the example in which the signal of the Ack command [A] that the communication device 20 transmitted is attenuated, and a reception error is detected when the wireless tag TG3 receives the Ack command [A], is shown.

After the communication device 20 transmits the Ack command [A], the reception is timed out while the communication device 20 waits for reception of ID information [ID] from the wireless tag TG3 and the slot is changed to the next slot in the same manner described above. After that, operation is performed as described above and the communication device 20 communicates with a large number of wireless tags in a shop by a normal reading function and receives the ID information [ID].

Returning to FIG. 7, the control section 33 determines whether or not the tag identification information is read by the first reading function in Act A8. If the tag identification information is read, in Act A9, the read tag identification information is stored in the memory section 35 in the order of reading and the tag identification information is displayed on the notification section 24. Then, the procedure returns to Act A7. In addition, in Act A8, even if the tag identification information is not read, the procedure returns to Act A7.

As shown in FIG. 5, the communication device 20 includes the correction section 38. The correction section 38 transmits the identification information of the wireless tag that is read in Act A9 in FIG. 7 to the host equipment 100 through the communication section 32. As a result of obtaining information corresponding to the identification information from the host equipment 100, if it is detected that a different kind of a wireless tag has been read, the correction section extracts corresponding Pt from the tag sensitivity information 355 and recalculates the estimated tag direction range by the direction range calculation section 37 using the methods described above.

Then, the calculated estimated tag direction range is displayed on the notification section 24. Alternatively, the wireless tag may be detected by including the identification information 13 of the wireless tag 11 or data which shows the kind of the wireless tag in a part of the memory section 12 of the wireless tag. Even if the kind of the target wireless tag 11 changes, an estimated tag direction range can be calculated in response to the target wireless tag and displayed by providing the correction section 38. Accordingly, a miss of the target wireless tag is reduced.

As described above, in the first embodiment, the direction range of the target wireless tag 11 can be estimated and displayed for the user. As a result, the user can recognize that the target wireless tag is not necessarily present in the front direction of the communication device 20, and the missing of the target wireless tag is reduced by the user changing the front direction of the communication device 20 accordingly.

Second Embodiment

Next, a second embodiment of the wireless tag communication device will be described. In the second embodiment, the target wireless tag is searched by the second reading function and the wireless tag 11 is designated based on the control of the control section 33 to perform a search operation.

Figure 13B:
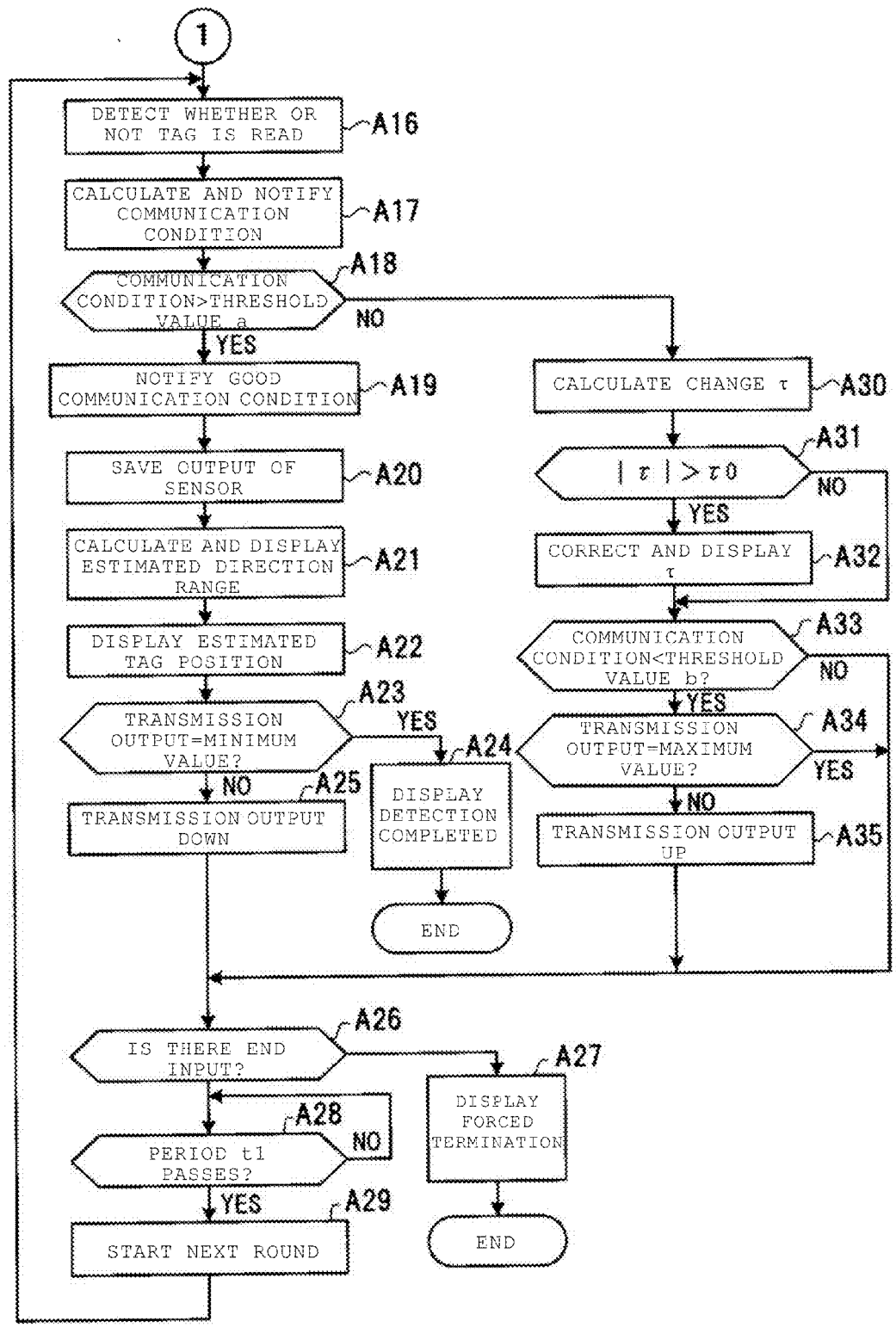
FIG. 13B is a flowchart showing the processing procedures of the control section subsequent to FIG. 13A.

FIGS. 13A and 13B are flowcharts showing processing procedures of the control section 33 if the communication device 20 searches the target wireless tag 11 by the second reading function. In FIG. 13A, if an operator carries the communication device 20 and operates a search operation start key of the input section 25, the reading operation program is activated (started).

First, in Act A11, the control section 33 sets identification information of a tag to be searched which is input from the input section 25. Next, in Act A12, transmission output information in the search operation is set. As the transmission output information, an initial value of a transmission output to be used when the search operation is started, and a minimum value of a transmission output to be used when the search operation ends are set. If there is no input from the input section 25, a transmission output is set by the communication control section 36 using the transmission output information 352 previously stored in the memory section 35.

In the search operation, the initial value of the transmission output is set to a maximum value of the transmission output that can be set, and here, an example in which the maximum value is set to 500 mW will be described. In addition, an example in which the minimum value of the transmission output is set to 20 mW will be described. That is, the presence range of the target tag is narrowed and set to a range that is readable with 20 mW of a transmission output.

Next, in Act A13, information of an estimated reading distance to be used by the direction range calculation section 37 is set. If there is no input from the input section 25, the estimated reading distance information stored in the memory section 35 in advance is used. Here, an example in which the estimated reading distance information is set to 1 m will be described.

Next, in Act A14, the control section 33 sets the second reading function by the function setting section 73 of the communication control section 36. In Act A14, a transmission output setting signal corresponding to a predetermined transmission output when the second reading function is used is output from the transmission output setting section 71. Further, the transmission signal when the second reading function is used is output from the transmission control section 72, and the transmission control section 72 sets transmission timing and the like. For ease of description, the initial value of the transmission output is set to the maximum value of the transmission output that can be set by the communication device 20.

If the control section 33 starts a reading operation by the second reading function in Act A15, the transmission output setting signal is output from the transmission output setting section 71, a non-modulation carrier signal is emitted from the antenna 22 as radio waves and the transmission signal is output from the transmission control section 72 to perform transmission to the wireless tag 11 to be searched.

Figure 14:
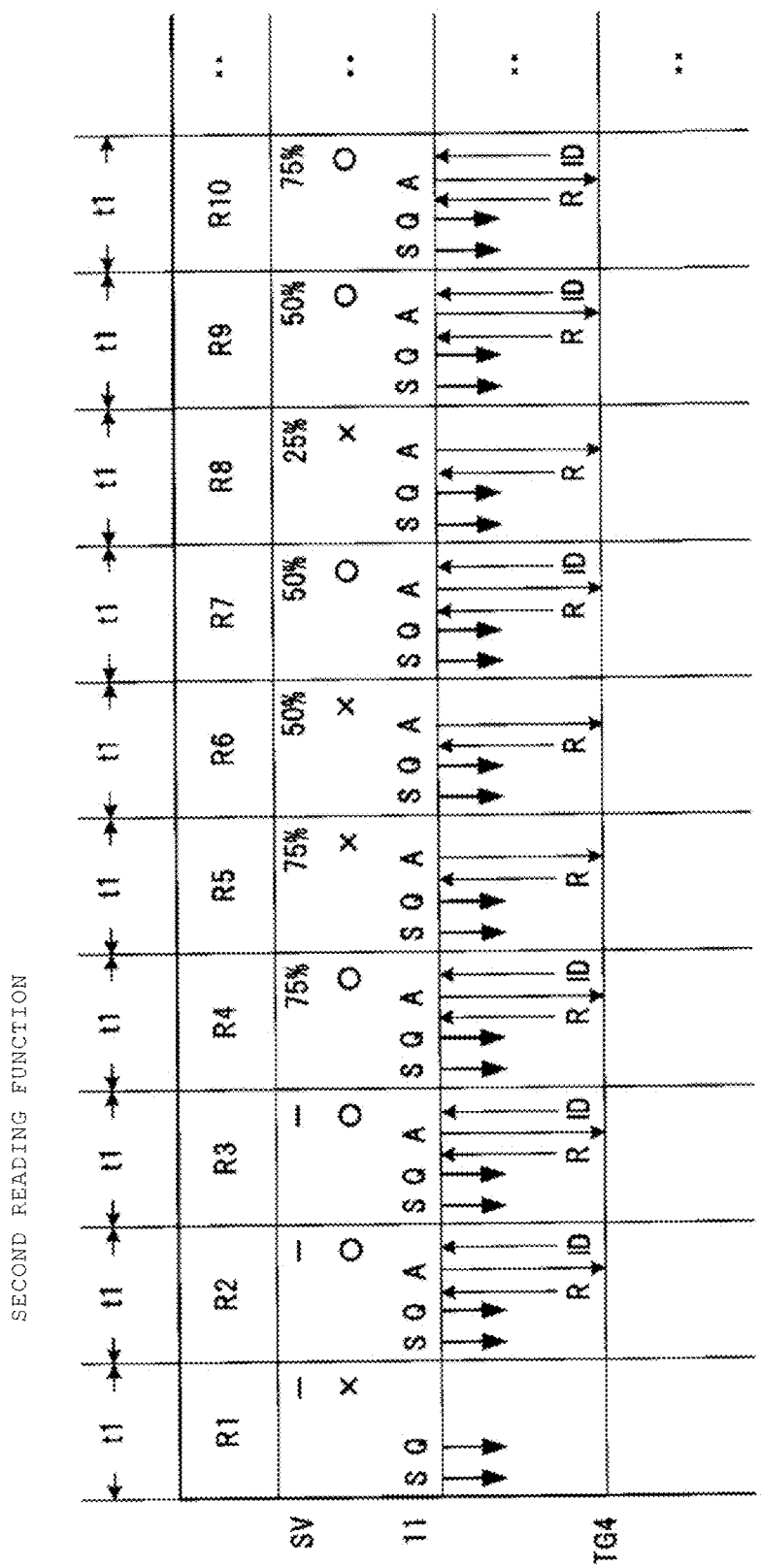
FIG. 14 is a timing chart of a wireless communication protocol according to the second embodiment.

Hereinafter, an example in which the wireless tag TG4 in FIG. 14 is set to a target tag and the identification information of the wireless tag TG4 is set to perform reading by the second reading function will be described. FIG. 14 is a timing chart showing an example of a wireless communication protocol between the communication device 20 and the wireless tag TG4 when a reading operation is performed by the second reading function. Similar to FIG. 12, an example according to the protocol of ISO18000-6 type C is shown and the number of slots per round is "1".

All symbols [S], [Q], [R], [A], and [ID] indicate communication data. In the head of each communication data, a preamble code indicating the head of data is included and in each communication data except [S], an error detection code such as a cyclic redundancy check (CRC) code is included so as to detect an error on a reception side.

In FIG. 14, a circle "O" means success in reception of ID information [ID] of the communication device 20 in each round. A symbol "X" means failure in reception. First, the communication device 20 transmits a non-modulation carrier signal from the antenna 22 as radio waves as described above. Next, the communication device 20 transmits a Select command [S] and then, transmits a Query command [Q] to start a first round R1. In the Select command [S], the identification information of the wireless tag TG4 is set so that only the wireless tag TG4 which is a target of a designated repeated reading function responds.

If other wireless tags (i.e., other than the wireless tag TG4) receive the Select command [S] and Query command [Q], other wireless tags determine that the identification information different from the identification information of the other wireless tags is designated and do not transmit a response signal [R]. The first round 1 is an example in which the communication device 20 detects a reception timeout while waiting for a response signal [R] for the reasons that radio waves do not sufficiently reach the wireless tag TG4 and the like.

When a period t1 passes after the transmission of the Select command [S] in the round R1 is started, the communication device 20 transmits the Select command [S] in which the identification information of the wireless tag TG4 is set so that only the wireless tag TG4 responds. Next, the communication device 20 transmits the Query command [Q] to start a second round R2. The second round R2 shows a case in which the communication device 20 correctly receives the ID information [ID] from the wireless tag TG4.

After that, in the same manner, when a period t1 passes after the transmission of a Select command [S] is started, the communication device 20 transmits the Select command [S] in which the identification information of the wireless tag TG4 is set so that only the wireless tag TG4 responds, and then, transmits a Query command [Q] to start the next round. Rounds R5, R6 and R8 show an example in which after the communication device 20 transmits an Ack command [A], the communication device 20 detects a reception timeout while waiting for the ID information [ID] and the reception of the ID information [ID] has failed.

In addition, the control section 33 detects whether or not the ID information [ID] is correctly received in each round, and calculates a reception success rate, for example, including the results of whether or not the ID information [ID] is received in last three rounds. In the example of FIG. 14, a communication success rate SV calculated in the round R4 is 75% from the results of whether or not the ID information [ID] is received in the rounds R1 to R4. The communication success rate SV calculated in the round R5 is 75% from the results of whether or not the ID information [ID] is received in the rounds R2 to R5.

FIG. 14 shows the example in which communication condition is determined using the communication success rate SV, but the number of rounds in which ID information [ID] is received continuously, the number of rounds in which ID information [ID] cannot be received continuously, or other methods may be used. In addition, in FIG. 14, a period of each round is set to t1, but the period of each round may be changed depending on whether or not the ID information [ID] is read.

Next, the procedure moves to FIG. 13B from FIG. 13A. In Act A16, the control section 33 starts a reading operation by the second reading function and detects whether or not the ID information [ID] is received in the round as described above. In addition, the control section calculates communication condition in Act A17. Here, the communication success rate SV is calculated as communication condition. Further, the calculated communication success rate SV may be displayed on the notification section 24.

Next, in Act A18, the control section 33 compares the calculated communication success rate SV with a threshold value a. The threshold value a is a threshold value for determining that communication condition is good if the communication success rate SV is larger than the threshold value a, and here, the threshold value a is 70%.

If the communication success rate SV is larger than the threshold value a, the control section 33 determines that the communication condition is good in Act A19, and causes the notification section 24 to display a message, for example, with a content that "the target wireless tag is present in an direction in which an antenna is directed. Please move forward to the direction". Further, in Act A20, it is determined that the target tag is present within the estimated tag direction range in the front direction with accuracy and so the output from the sensor 39 is saved.

Further, in Act A21, the estimated tag direction range is calculated according to the above Equation (3) by the direction range calculation section 37 and the fan-like graphic image 102 showing the estimated tag direction range is displayed. In addition, in Act A22, the estimated position of the target wireless tag TG4 is displayed on the notification section 24.

Figure 15:
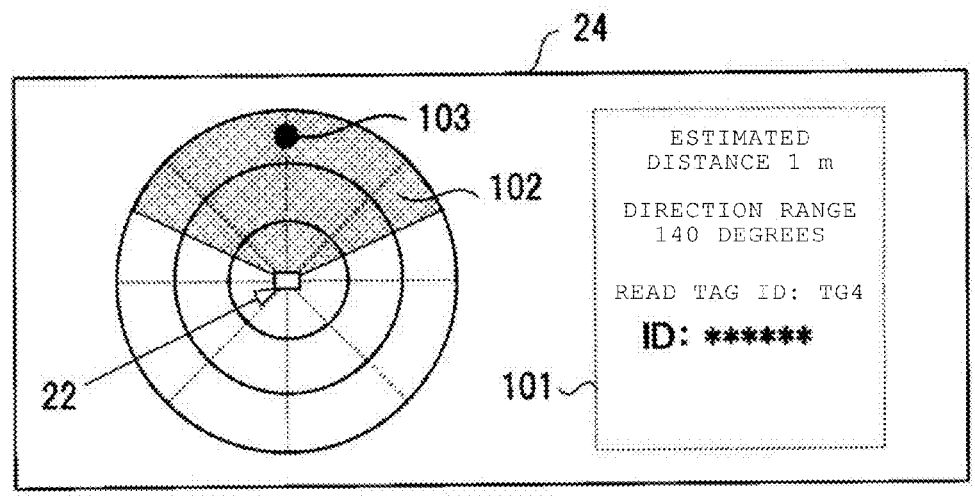
FIG. 15 is a diagram for explaining a first display example of an estimated tag direction range according to the second embodiment.
Figure 16:
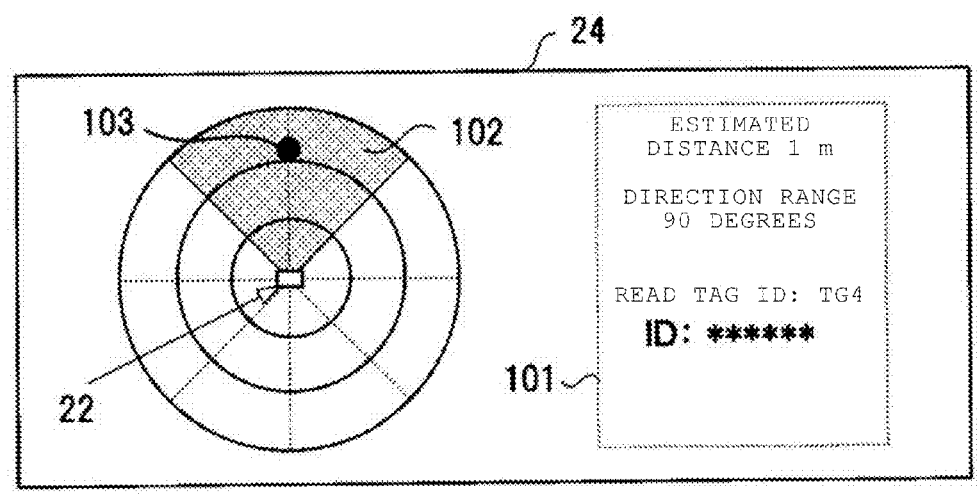
FIG. 16 is a diagram for explaining a second display example of the estimated tag direction range according to the second embodiment.
Figure 17:
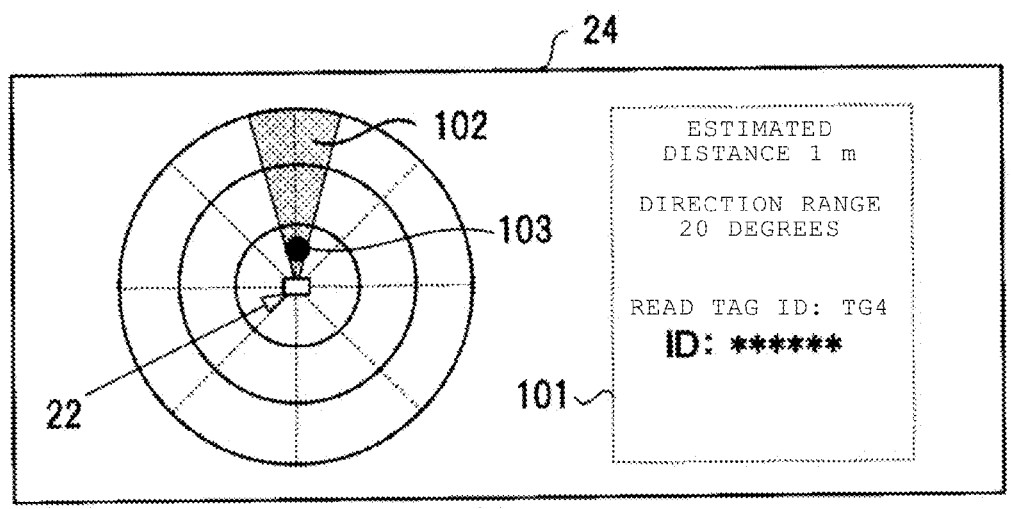
FIG. 17 is a diagram for explaining a third display example of the estimated tag direction range according to the second embodiment.

In FIGS. 15 to 17, display examples of visible images on the notification section 24 are shown. First, FIG. 15 shows a display example of the characters 101 and the fan-like graphic image 102 when the communication success rate SV is larger than the threshold value a. In FIG. 15, a calculation example of the direction range calculation section 37 is shown in which the transmission output is 500 mW at the antenna connection terminal 75, the estimated reading distance used in the direction range calculation section 37 is 1 m, and the power necessary for the communication of the wireless tag TG4 is Pt.

In addition, a mark is displayed as the visible image showing the estimated tag position. The mark is, for example, a dot 103. Since the communication condition is determined to be good, the mark (dot) 103 is displayed in the current front direction of the communication device 20. The position in a radial direction is displayed such that the larger the transmission output is, the farther the position is, and the smaller the transmission output is, the closer the position is, based on the set maximum value and the minimum value of the transmission output. The display of FIG. 15 shows that the estimated tag direction range is about 140 degrees and the position of the wireless tag TG4 (dot 103) may be relatively far for the user. Accordingly, the user can simply recognize the position of the wireless tag TG4.

Next, in Act A23, the control section 33 compares the current transmission output of the communication device 20 with the minimum value of the predetermined transmission output in the second reading function. If the current transmission output is the minimum value, in Act A24, the meaning of "the target wireless tag is present in the minimum reading range" is displayed on the notification section 24 to end the procedure. In addition, if the current transmission output is larger than the minimum value, in Act A25, the control section 33 decreases the transmission output by one step and narrows the reading range.

Next, in Act A26, the control section 33 detects, for example, whether or not a search operation end key is input from the input section 25. If the end input is detected, in Act A27, the meaning of "end" is displayed on the notification section 24, and the procedure ends. If the end input is not detected, the reading operation of the second reading function continues.

In Act A28, if the control section 33 detects that the period t1 passes after the round is started, as described above, the control section transmits the Select command [S] in which the wireless tag identification information of the wireless tag TG4 is set and then, transmits the Query command [Q], the next round is started in Act A29, and the procedure returns to Act A16 to repeat the operation.

If the communication condition, which is larger than the threshold value a, continues and the transmission output is decreased stepwise, in the visible image display on the notification section 24, for example, as shown in FIG. 16, the angle in the fan-like graphic image 102 of the estimated tag direction range is decreased and the displayed position of the dot 103 showing the estimated tag position is closer to the center than in FIG. 15. In addition, the value of the angle of the direction range displayed by the characters 101 is less.

In Act A23, if the transmission output is the minimum value, that is, the transmission output is narrowed to the minimum value, for example, as shown in FIG. 17, the angle of the fan-like graphic image 102 is decreased even more and the displayed position of the dot 103 is even closer to the center in the visible image displayed on the notification section 24. In addition, the value of the angle of the direction range displayed by the characters 101 is less. That is, the position of the dot 103 is changed in a direction opposite to the wireless tag 11 according to the transmission output in the visible image.

Further, if it is determined that the communication success rate SV is equal to or smaller than the threshold value a in Act A18, the control section 33 detects an output of the sensor 39 in Act A30 and calculates a difference ('r) between the output and detected value of the sensor saved in Act A20. In Act A31, if it is determined that an absolute value of τ is larger than a predetermined threshold value τ0, the display on the notification section 24 is changed according to the τ value.

Figure 18:
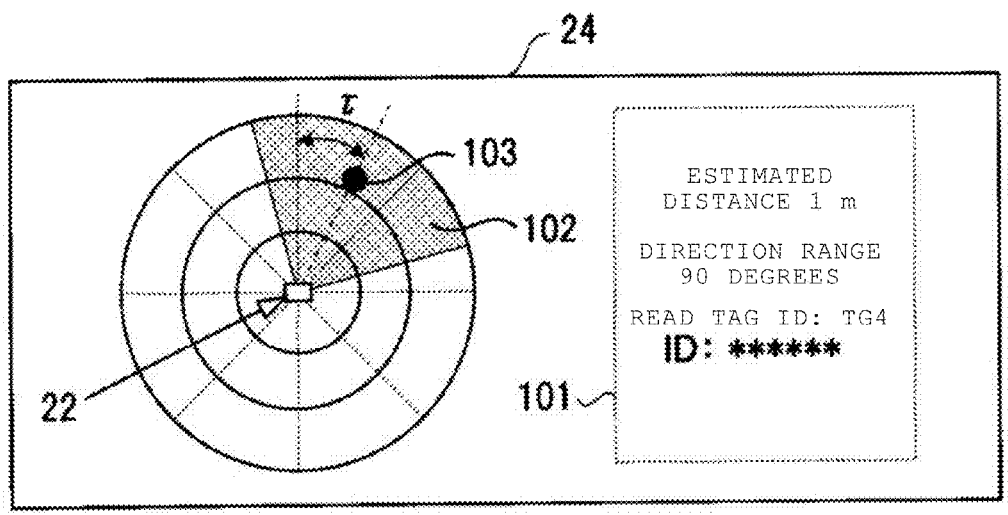
FIG. 18 is a diagram for explaining a fourth display example of the estimated tag direction range according to the second embodiment.

For example, after the display is shown as shown in FIG. 16, the direction of the communication device 20 is changed and, for example, if it is determined that τ is 20 degrees in the counterclockwise direction, the display of the fan-like graphic image 102 in FIG. 16 is changed to a display in which τ is rotated by 20 degrees in a clockwise direction as shown in FIG. 18. That is, the direction of the communication device 20 when the communication condition is determined to be good is at 20 degrees in the clockwise direction from the current direction of the communication device 20.

Next, in Act A33, the control section 33 compares the communication success rate SV with a threshold value b. The threshold value b is a threshold value for determining the communication condition to be bad if the communication success rate SV is smaller than the threshold value b, and for example, the threshold value b is 30%.

In Act A34, the control section 33 compares the current transmission output of the communication device 20 with the maximum value of the predetermined transmission output in the second reading function. If the current transmission output is smaller than the maximum value, in Act A35, the transmission output is increased by one step. Then, the procedure proceeds to Act A26 to perform the same operation.

In the second embodiment, the user can simply recognize the estimated tag direction range and estimated tag position of the target tag from the notification section 24, and thus, it is possible to efficiently search the target tag in a short period of time without missing the tag. In addition, as the estimated tag direction range is narrowed and the estimated tag position becomes closer to the center, the user can recognize in a reliable manner that the user is approaching the target tag.

Further, even if the user changes the direction of the communication device 20, the communication device compares the communication condition and the threshold value and displays the estimated direction and the estimated position of the tag using the output of the sensor 39. Thus, the user can efficiently search the target tag in a short period of time without missing the tag.

The notification may be performed using a buzzer in conjunction with the angle of the estimated tag direction range and the estimated tag position. By changing a tone interval (frequency), a ringing time, a ringing interval time of the buzzer, the user can be notified of approaching to the target tag.

As shown in FIG. 4, if the image capturing section 220 is provided in the antenna 22, while the image captured by the image capturing section 220 is displayed on the notification section 24, the fan-like graphic image 102 showing the estimated tag direction range and the dot 103 showing the estimated tag position can be displayed by overlapping with the captured image.

Figure 19:
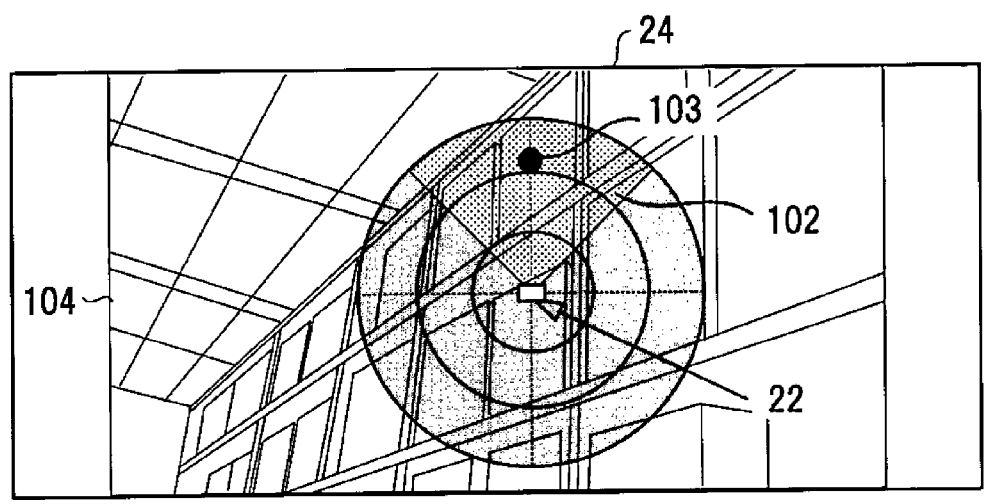
FIG. 19 is a diagram for explaining a fifth display example of the estimated tag direction range according to the second embodiment.

FIG. 19 shows a display example in which an image 104 (for example, an image of a warehouse) captured by the image capturing section 220 overlaps with the fan-like graphic image 102 and the dot 103. The user can recognize the direction of the communication device 20 and the maximum directivity direction of the antenna from the image 104 captured by the image capturing section 220 and thus, usability is further improved.

As described above, in the second embodiment, the estimated direction range and the estimated position of the target wireless tag 11 can be displayed to the user.

In addition, in the above description, as an example of the host equipment 100, a server is used. However, the host equipment 100 can be configured with a laptop personal computer, a smart phone (multi-functional mobile phone), a tablet terminal and the like, other than the sever. Further, the example in which the estimated tag direction range and position are displayed on the display of the notification section 24 is shown, but the estimated tag direction range and position may be displayed on a personal computer which is the host equipment 100 and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device for communicating with a passive and designated wireless tag through a directional antenna, the wireless tag communication device having an input section and a memory, the device comprising:
a wireless tag communication section configured to communicate with the passive and designated wireless tag, the wireless tag being designated based on identification information received from the input section;
a calculation section configured to estimate a direction angle for communicating with the wireless tag based on a relation among transmission output power of the wireless tag communication device, an attenuation amount corresponding to an estimated reading distance between the antenna surface and the wireless tag, and sensitivity information for the wireless tag, the estimated reading distance being selected from a first distance received as input from the input section and a second distance previously stored in the memory;
a display section configured to display the estimated direction angle; and
a communication control section configured to detect the quality of a communication state of the wireless tag communication section and the wireless tag and control the wireless tag communication section to transmit a signal at the estimated direction angle to the wireless tag based on the detected quality of the communication state.

2. The device according to claim 1,
wherein the calculation section is configured to estimate the direction angle based also on directivity information of the antenna.

3. The device according to claim 1,
wherein the calculation section is configured to generate an image depicting the estimated direction angle for display on the display section.

4. The device according to claim 3, further comprising:
a sensor configured to detect a direction of the wireless tag communication device,
wherein the calculation section is configured to generate the image based on an output from the sensor.

5. The device according to claim 4, wherein the image is changed to depict the estimated direction angle as being rotated when the sensor detects a change in the direction of the wireless tag communication device.

6. The device according to claim 1, further comprising:
a memory section that stores sensitivity information of the wireless tag; and
a correction section that corrects the estimated direction angle based on the sensitivity information.

7. A wireless tag communication device for communicating with a passive and designated wireless tag through a directional antenna, the device comprising:
a wireless tag communication section configured to communicate with the passive and designated wireless tag, the wireless tag being designated based on identification information for the wireless tag;
a communication condition detection section configured to detect a communication condition between the wireless tag communication section and the wireless tag;
a calculation section configured to generate an image that depicts a position of the wireless tag in relation to an estimate of a direction angle for communicating with the wireless tag, such that the depicted position of the wireless tag changes according a value representing the communication condition, the calculation section determining the estimate of the direction angle based on a relation among transmission output power of the wireless tag communication device, an attenuation amount corresponding to an estimated reading distance between the antenna surface and the wireless tag, and sensitivity information for the wireless tag;
a display section configured to display the image; and
a communication control section configured to control the wireless tag communication section to transmit a signal at the estimated direction angle to the wireless tag based on the detected communication condition by the communication condition detection section.

8. The device according to claim 7, wherein the image depicts the wireless tag in relation to the estimated direction angle.

9. The device according to claim 8, wherein if the value is larger than a predetermined threshold, the estimated direction angle is narrowed and a position of the wireless tag depicted in the image is changed.

10. The device according to claim 8, wherein if the value is larger than a predetermined threshold, the transmission output power of the wireless tag communication device is decreased.

11. The device according to claim 8, wherein if the value is smaller than a predetermined threshold, the transmission output power of the wireless tag communication device is increased.

12. The device according to claim 8, further comprising:
a sensor configured to detect a direction of the wireless tag communication device,
wherein the image is changed to depict the estimated direction angle as being rotated when the sensor detects a change in the direction of the wireless tag communication device.

13. The device according to claim 8, further comprising:
an image capturing section configured to capture an image in a direction parallel to a maximum transmission direction of the antenna,
wherein the image captured by the image capturing section is displayed with the image depicting the estimated direction angle and a position of the wireless tag.

14. The device according to claim 13, further comprising:
a sensor configured to detect a direction of the wireless tag communication device,
wherein the image depicting the estimated direction angle and the position of the wireless tag is rotated with respect to the image captured by the image capturing section when the sensor detects a change in the direction of the wireless tag communication device.

15. A wireless tag communication program stored in a non-transitory computer readable medium and executable in a device to cause the device to communicate with a passive and designated wireless tag through a directional antenna and carry out the steps of:
designating the wireless tag based on identification information received from an input section of the device;
estimating a direction angle for communicating with the wireless tag based on a relation among transmission output power of the device, an attenuation amount corresponding to an estimated reading distance between the antenna surface and the wireless tag, and sensitivity information for the wireless tag, the estimated reading distance being selected from a first distance received from then input section of the device and a second distance previously stored in a memory of the device;
displaying the estimated direction angle on a display;
detecting the quality of a communication state of the wireless tag communication section and the wireless tag and transmit a signal at the estimated direction angle to the wireless tag based on the detected quality of the communication state.

16. The program according to claim 15, wherein the direction angle is estimated based also on directivity information of the antenna.

17. The program according to claim 15, wherein the steps further include:
generating an image depicting the estimated direction angle for display on the display.

18. The program according to claim 17, wherein the image is generated based on an output from a sensor configured to detect a direction of the device.

19. The program according to claim 18, wherein the image is changed to depict the estimated direction angle as being rotated when the sensor detects a change in the direction of the device.

20. The program according to claim 15, wherein the steps further include:
correcting the estimated direction angle based on sensitivity information of the wireless tag.

21. A method of communicating with a passive and designated wireless tag through a directional antenna, comprising:
receiving identification information to designate the wireless tag;
estimating a direction angle for communicating with the wireless tag based on a relation among transmission output power, an attenuation amount corresponding to an estimated reading distance between a surface of the antenna and the wireless tag, and sensitivity information for the wireless tag;
displaying the estimated direction angle;
detecting quality of communication with the wireless tag; and
controlling transmission of a signal at the estimated direction angle to the wireless tag based on the detected quality of the communication with the wireless tag.

* * * * *